Sept. 12, 1967  W. H. EISELE  3,341,796
FORCE TRANSDUCER

Filed March 23, 1966  3 Sheets-Sheet 1

INVENTOR.
WALTER H. EISELE
BY

Sept. 12, 1967   W. H. EISELE   3,341,796
FORCE TRANSDUCER

Filed March 23, 1966   3 Sheets-Sheet 3

WALTER H. EISELE
INVENTOR.

KENDRICK, SUBKOW and STOLZY
BY

ATTORNEYS

United States Patent Office 3,341,796
Patented Sept. 12, 1967

3,341,796
FORCE TRANSDUCER
Walter H. Eisele, Pacific Palisades, Calif., assignor to Statham Instruments, Inc., Los Angeles, Calif., a corporation of California
Filed Mar. 23, 1966, Ser. No. 536,710
16 Claims. (Cl. 338—5)

ABSTRACT OF THE DISCLOSURE

This invention relates to a beam flexure and a transducer employing such beam flexures. The beam is fixed at one end, free to deflect at the other end. The line of application of the force is applied so as to pass through an intermediate region of the beam where a stress reversal occurs. The force is transmitted to the free end by a link which is in turn connected from the force-transmitting member. When used in a transducer, a strain gage may be connected to the beam. Preferably, gages are bonded to the beam, one on each side of the stress reversal region.

---

This application is a continuation-in-part of application Ser. No. 497,688, filed Oct. 19, 1965, now abandoned.

The flexure of my invention is a beam fixed at one end only and loaded at the other end, here referred to as the loaded end, but free to deflect at the loaded end when a force is applied. It is a characteristic of the flexure of my invention that, upon the application of the load as described above, the stresses in the beam reverse at an intermediate point of the beam between the loaded end and the fixed end, the stresses being in tension on one side and in compression on the other side of said intermediate region.

In the preferred embodiment of my invention, I connect the member which applies the force to the loaded end of the beam in such a manner that the line of application of the force which causes the deflection of the loaded end passes through the aforesaid intermediate region. In such case, the member is not subjected to an unbalance of forces and the net force exerted at the beam upon the member is negligible.

In the ideal case, where the line of application of force intersects the beam in the region of stress reversal where the net stress is zero, no net force is exerted on the member by reason of the flexing of the beam. In such a case, a stress reversal appears in the beam on the same side of the median plane of the beam, being compressive on one side and tensile on the other side of the stress reversal region. The reversal occurs irrespective of the direction of the applied force with respect to the perpendicular to the median plane.

In my preferred embodiment, I arrange the structure such that the line of application of the force is directed substantially perpendicular to the median plane of the undeflected beam at the intermediate region. In such case, the stresses in the beam will be in balance as described above.

By designing the beam to be symmetrical on both sides of the stress reversal region and by applying the force to pass in the direction substantially perpendicular to the median plane at the intermediate region, the scalar value of the stresses in the beam on both sides of the intermediate region will be substantially equal. Where a mechanical connection is made between the beam and the member which applies or transmits the force to create the load at the loaded end, which member is herein referred to as the force member, the beam will function in the above-described manner irrespective of the rigidity or flexibility of the force member. Since the net force exerted at the end of the force member as a result of the deflection of the beam is unsubstantial and ideally zero, substantially no bending moment is imposed on the force member.

In order to transmit the force to the loaded end of the beam from the force member, I provide a link connecting the force member to the loaded end, such that the line of application of the force by the force member passes through the intermediate region. In the preferred embodiment of my invention, the force member is displaced laterally from the load end, so that the line of application of the force passes through the intermediate region as described above. I employ a link to connect the force member to the load end.

One of the useful applications of the flexure of my invention is to embody the flexure in the transducer whereby the stresses in the beam are made responsive to a condition to be sensed.

The condition, for example, pressure, acceleration, or motion, is converted into a force which is transmitted by a member such as the force member described above. In such case, the force member may be termed a force sensing means which senses all the forces created by the condition to be sensed.

I employ stress sensitive means to identify and measure the values related to the sign and magnitude of the stresses. Such stress sensitive means may suitably be strain gages. I prefer to employ the bonded type of strain gages. Such gages include strain wires and other filaments pasted or otherwise positioned on the beam, or photo-deposited or vacuum-deposited filaments, as will be understood by those skilled in this art.

I may then, by means of such stress-sensitive means, obtain a reading which will be related to the motion of the force member and therefore to the value of the condition to be sensed.

It is one of the advantages of my invention that all of the gages may be placed on one side of the beam and may be connected in Wheatstone bridge arrangement to provide four active arms of the bridge. Such bridges are termed fully active. All four arms vary in resistance, two increasing and two decreasing in resistance as the stresses are varied on deflection of the beam.

It is desirable in strain gages to be used in Wheatstone bridge arrangement that all arms of the Wheatstone bridge be positioned at locations of equal stress variation. By connecting the arms in Wheatstone bridge arrangement with each gage subjected to a like variation in the scalar value of the imposed stresses, I may obtain a bridge output which is sensibly proportional to the deflection of the loaded end and thus the stress variations.

Since the gages extend over finite regions of the beam, I prefer to form the beam section so that a substantially uniform stress extends across the regions of which the strain gages are positioned.

In order to provide for uniform stress levels throughout these regions of the beam, compressive at one end and tensile at the other end of the beam, I shape the beam so that its minimum cross section is in the region of the stress reversal. The beam may be made of uniform width with thickness reduced towards the center of the beam to form a linear wedge, with the minimum thickness preferably not more than about half of the thickness at the thickest section of the beam. I may make the beam of uniform width and with the upper or lower edges of the beam thickness paraboloid in shape, while the edge is a straight line. I may also, however, keep the thickness uniform and make the width triangular in shape, either isoceles or right angular.

The design of simple cantilever beams to produce substantially uniform stresses is well known. I apply these principles in a novel manner to the beam flexure of my invention and design each end of the beam to have each the same cross section and length from the region of stress reversal to the region of maximum stress at each end of the beam.

I prefer, however, for simplicity of construction, to employ a beam of uniform width and double wedge formation.

In a preferred embodiment I form the beam in two divergent wedges of equal geometry with a minimum beam thickness or width in the region of the line of force as described above.

The generic concept of my invention is thus a beam flexure, fixed at one end and loaded at the other, wherein the load is applied at the loaded end of the beam and is translated from a force applied in the direction to pass through the intermediate region of minimum stress in the beam flexure, whereby the loaded end of the beam is deflected and the stresses reverse in the region of minimum stress.

By designing the beam to be symmetrical and to provide for substantially uniform stress levels on each side of the stress reversal region and also by applying the line of force to pass in a direction perpendicular to the median plane at the region of minimum stress so that the line of force application intersects the median plane at the stress reversal region, the scalar values of the stress levels and the variations in stress levels on both sides of the stress reversal region may be made substantially equal.

In the embodiment which I now prefer and which is illustrated in the drawings, the beam is formed with divergent wedge sections, and a motion to be sensed is applied in the region of minimum beam section located in the region of minimum stress. The line of application of the force is substantially perpendicular to the median plane at the stress reversal region.

Suitable stress-sensing means which, in my preferred embodiment, are foil strain gages such as are well known in the art, are positioned on a surface of the beam.

One important advantage of the transducer of my invention is the symmetry of arrangement of the parts of the transducer. By orienting the force application member in the region of the stress reversal, I may minimize the volume occupied by the transducer parts. It is conventional in pressure gages, accelerometers, dynamometers and other such instruments to connect the force summing rod at the center of the diaphragm.

By linking the diaphragm or bellows or other flexure by linkage such as employed in my invention, the beam flexure may be made to overlay the diaphragm, bellows or other flexure. This also makes possible an increase in the area for the position of the strain gages without increasing the diameter of the diaphragm, bellows or other flexure or the cross-sectional areas of the transducer case.

These and other objects of my invention will be further described in connection with the drawings, of which:

Figure 1:
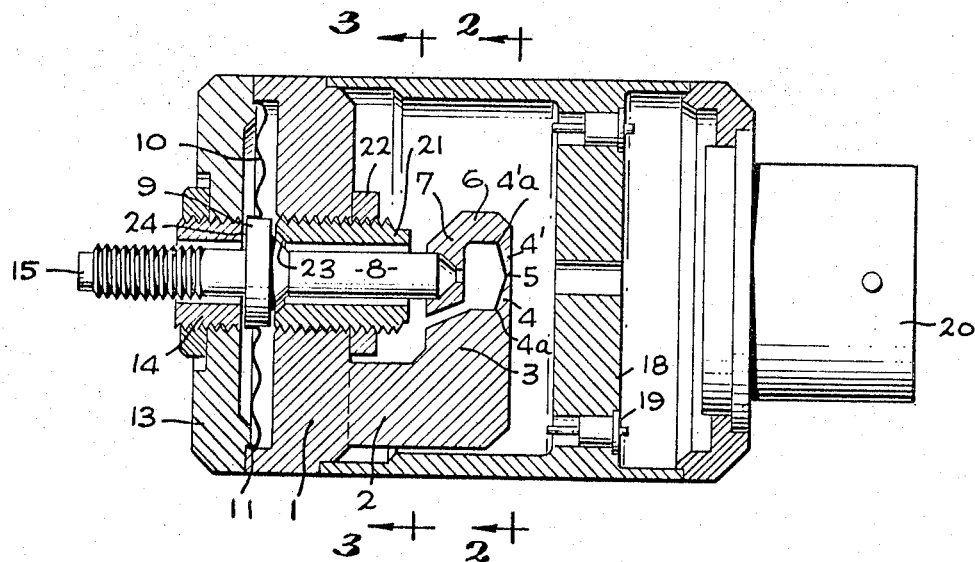
FIG. 1 is a sectional view, with parts in elevation, of a preferred form of my invention.
Figure 2:
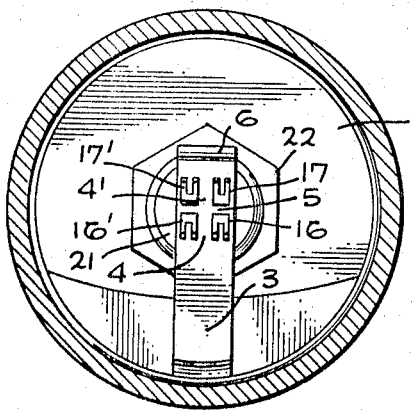
FIG. 2 is a section on line 2—2 of FIG. 1.
Figure 3:
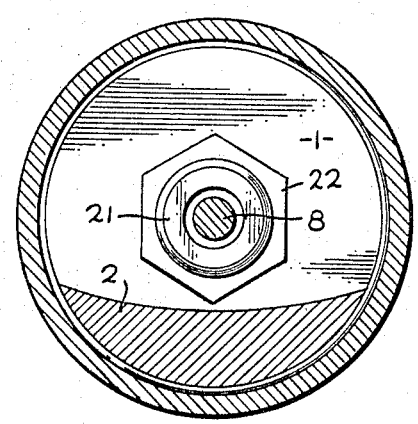
FIG. 3 is a section on line 3—3 of FIG. 1.

In FIG. 1, the base 1 carries a rigid platform 2 formed integrally with the base 1. Formed integrally with the platform 2 is a rigid cantilever section 3 terminating in the flexure beam formed of two wedge sections 4 and 4' whose angular surface intercepts the reduced section 5. The angular underneath surface is inclined to meet at an apex. The underneath surface of the region 5 is parallel to the upper surface of the beam and extends for a minimum fraction of the beam length. The beam is of uniform width. The root 4a of the flexure 4 is rigidly joined to the rigid section 3 of the same width as the beam section 4. The beam section 4' is of the same length, width and thickness and wedge shape as 4. Its root section 4'a is formed with the rigid section 6 of the rigid L link, whose horizontal section 7 is connected to the motion-transmitting rod 8. The rod 8 passes through a bore in 1, in which is threaded a stop 21 held in position by a nut 22. The rod 8 is attached to the diaphragm 10 at 9. The axis of said rod 8 is in a line which intersects the median plane at 5 in the region of stress reversal. The diaphragm, at its periphery 11, is rigidly joined to the base 1. The flat portion of 9 is spaced from the end of 21 for a distance shown at 23 which is equal to the permissible deflections for the stresses to be measured by the strain gages and which will develop the chosen maximum bending stress in the flexure as described above. The rod 9 is attached to the rod 15 forming an axial extension of the rod 8. The rod 15 passes through a suitable bore in 13. The stop 14 in the bore 13 also provides a space 24 of the same axial extent as the space 23 and for like reasons.

The surface of the beam flexure at 4 and 4' on both sides of the juncture at 5 carries four bonded strain gages positioned over like surface areas, for example, two foil gages 16 and 16' and two foil gages 17 and 17'. The gages 16 and 16' and 17 and 17' are symmetrically arranged on both sides of 5 and equally spaced on the beam. Such foil gages are well known in the art. Their ends are connected by suitable wires, not shown, to the insulated terminals 19 positioned in the partition 18. The terminals 19 are electrically connected to the cable connector 20 and permit the connection of the gages into a Wheatstone bridge.

It will be seen that the axis of the rods 15 and 18 is in line with and perpendicular to the junction at 5 where the stresses reverse. The beam sections 4 and 4' are flexure sections which will deflect one on each side of 5. With 5 at half the thickness of the beam section at the roots 4a and 4'a, the junction at 5 extends along the median plane of the flexure. The wedge sections 4 and 4' have the same width, length and angularity. The remaining portions of the linkage between the loaded end at 4'a and the rod 8 are rigid compared to the flexure sections at 4' and 4 as described above. The portions 1, 2, 3, 4, 4', 6 and 7 may be milled from one piece or built up by welding or other rigid connections as desired. However, it is preferred to make the sections 4' and 4 from one piece of metal of good physical properties, even if welding is used to build up the entire structure.

As described above, it will be seen that the single double wedge 4 and 4' is symmetrically placed with respect to the axis of the rod 8 and the diaphragm of the flexure 10. The fixed end of the flexure at 4a and its support at 2 are positioned over the diaphragm, and the loaded end at 4'a is also positioned over the diaphragm. Thus, the space occupied by the read-out device does not increase the diameter of the case required to house the diaphragm of flexure 10.

In the form shown in FIG. 1, the structure is a dynamometer. The rod 15 may be connected to any source of force which is responsive to a condition. Thus a load of any form which will cause a displacement of 15 may be connected to 15. The rod 15 and the flexure 10 thus form a force collector to cause the displacement of the rod 8.

With the rod 8 undeflected, no stress is developed in the sections 4 and 4'. Assuming a displacement to the left as viewed in FIG. 1, the displacement of rod 8 is transmitted to the root 4'a. No net force is exerted at the end of the rod where it joins the link at 7. Thus, no bending moment is imposed on the rod 8 of the linkages 6 and 7. Rod 8 thus need not be guided to move in a straight line. Because rod 8 has an absence of a net force at the junction perpendicular to the arms of 8, no substantial moment is exerted on 8 on deflection of the beam. The upper surface of the wedge section 4' is placed in tension and the upper surface of the wedge section 4 is placed in compression with stress reversal occurring at 5 where the stress passes through zero. The gages 17 and 17' are increased in electrical resistance, while the gages 16 and 16' are decreased in electrical resistance. When the bridge into which they are connected is energized by the application of a voltage, a voltage unbalance is developed in the bridge which is at the outputs of the corners which is proportional to the displacement of the rod 8.

Figure 4:
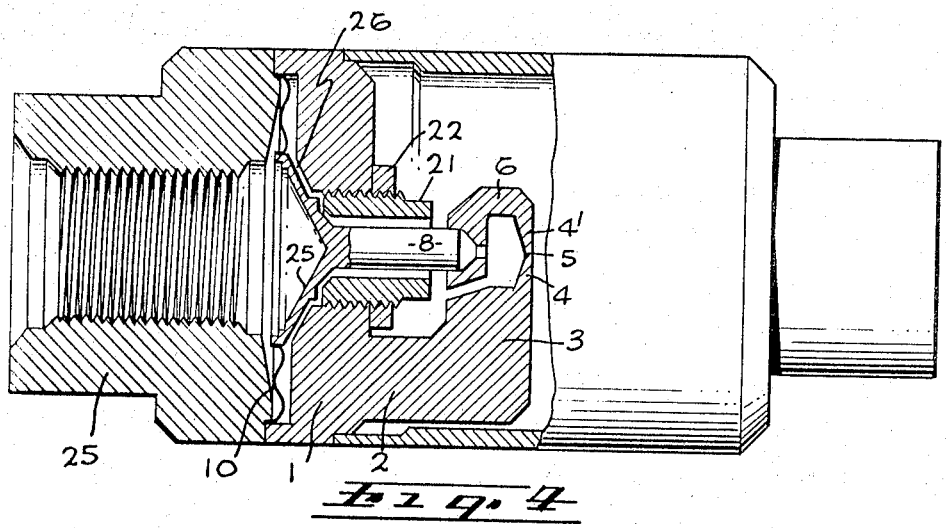
FIG. 4 and FIG. 5 are sectional views with parts in elevation of alternative forms of my invention.
Figure 5:
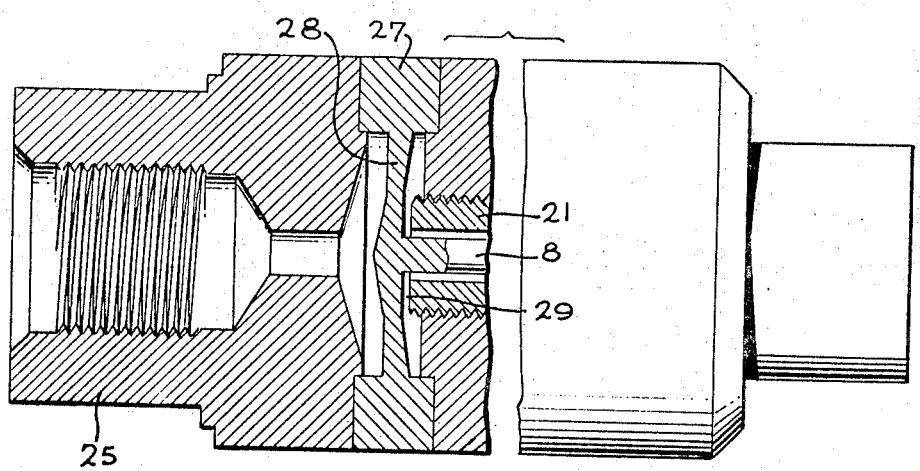

FIGURES 4 and 5 illustrate an adaptation of the transducer to a pressure gage. The corrugated diaphragm 10 in FIG. 4 is a force collector responsive to the pressure which may be applied to the pressure adapter 25.

An alternative form is shown in FIG. 5, where the rod 8 is attached to a machined diaphragm 28 formed integrally with the diaphragm ring 27. The diaphragm is spaced at 29 from the stop ring 21 as described above. All other parts of the transducer have the same structure as the similarly numbered parts in FIG. 1.

As was stated previously, since there is no bending moment imposed on the force member, it is not necessary that the force member be either rigid or guided in its motion.

Figure 6:
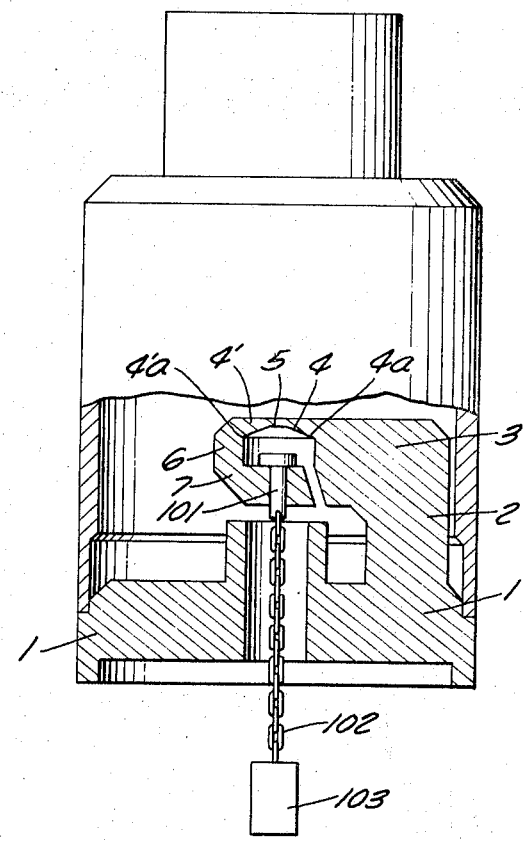
FIG. 6 is a section partly in elevation of a modified form of my invention.

FIG. 6 illustrates the application of my invention in which the force summing member has substantially no rigidity but in which the line of application of the force passes through the region of stress reversal. The construction is the same as shown in FIGS. 1 through 5.

All elements which bear the same numbers are the same in all figures.

The features which are different are that, in place of the rod 8, the rod 15 and the diaphragm 10, support 101 is positioned in a bore in 7 of the L-link, so that the axis of the support extends perpendicular of the median plane at 5 and intersects the median plane in the region of stress reversal. The chain 102, or other flexible member, is connected to the support 101, and the weight 103 is suspended from 102. The gravitational vector extends through the chain and axially through the support 101 and the bore in which it is positioned.

The stress reversal and the functions described above for the forms of FIG. 1 to FIG. 5 are equally applicable to the form shown in FIG. 6.

While I have described particular embodiments of my invention for the purpose of illustration, it should be understood that various modifications and adaptations thereof may be made within the spirit of the invention, as set forth in the appended claims.

I claim:
1. A flexure for a transducer, said flexure comprising a beam with a support at one end of the beam, said beam at said end fixedly connected to said support, the other end of said beam being free to deflect, a force-transmitting member, a linkage connecting said other end of said beam to the said force-transmitting member, the stresses in said beam reversing at a stress reversal region intermediate the ends of said beam, and means including said force-transmitting member to apply a force at said link, the line of said force application intersecting said beam at the region of stress reversal.

2. The flexure of claim 1, said beam at said stress reversal region having a reduced cross section.

3. The flexure of claim 1, said beam being in the form of two divergent wedge sections with the minimum section at said stress reversal region.

4. The flexure of claim 1, in which the line of application of the force extends perpendicular to the median plane of the beam at the stress reversal region.

5. The flexure of claim 4, said beam at said stress reversal region having a reduced cross section.

6. The flexure of claim 4, said beam being in the form of two divergent wedge sections with the minimum section at said stress reversal region.

7. The flexure of claim 1 in which said link is a rigid depending L-shaped link, said force transmitting member connected to said link at a region spaced from said free end.

8. The flexure of claim 7, said beam at said stress reversal region having a reduced cross section.

9. The flexure of claim 7, said beam being in the form of two divergent wedge sections with the minimum section at said stress reversal region.

10. The flexure of claim 7, in which the axis of said force-transmitting rod is perpendicular to the median plane of the beam at the region of stress reversal.

11. A transducer comprising a flexure, said flexure comprising a beam, a support at one end of said beam, said beam at said end supported and being fixedly connected to said support, a force transmitting rod, a linkage connecting the other end of said beam to said force transmitting rod, the axis of said force transmitting rod extending substantially perpendicular to the median plane of said beam, said beam undergoing a stress reversal at an intermediate region of said beam, said axis of said rod aligned to pass through said stress reversal region, one pair of strain sensitive filaments bonded to one side of said beam at one side of said stress reversal region and a second pair of strain sensitive filaments bonded to the said side of said beam on the other side of said stress reversal region.

12. The transducer of claim 11, said beam at said stress reversal region having a reduced cross section.

13. The flexure of claim 11, said beam being in the form of two divergent wedge sections with the minimum section at said stress reversal region.

14. The transducer of claim 11, in which said link is a rigid L-shaped link and said rod is connected to said link at a region spaced from said free end.

15. The transducer of claim 14, said beam at said stress reversal region having a reduced cross section.

16. The transducer of claim 14, said beam being in the form of two divergent wedge sections with the minimum section at said stress reversal region.

References Cited

UNITED STATES PATENTS

| | | | |
|---|---|---|---|
| 2,359,245 | 9/1944 | Ritzmann | 338—5 |
| 2,772,569 | 12/1956 | Ruge | 338—4 |
| 3,004,231 | 10/1961 | Laimins | 73—141 |
| 3,022,672 | 2/1962 | Dimeff et al. | 338—36 |
| 3,161,061 | 12/1964 | Ames | 338—2 |
| 3,161,844 | 12/1964 | Kabell | 338—2 |
| 3,168,718 | 2/1965 | Swartz et al. | 338—4 |
| 3,269,184 | 8/1966 | O'Connor | 338—4 |
| 3,277,698 | 10/1966 | Mason | 338—2 |

RICHARD M. WOOD, *Primary Examiner.*

W. D. BROOKS, *Assistant Examiner.*